US011610209B2

(12) United States Patent
Mathur et al.

(10) Patent No.: US 11,610,209 B2
(45) Date of Patent: Mar. 21, 2023

(54) METHODS AND APPARATUS FOR MAINTAINING A POWER CONVERSION SYSTEM

(71) Applicant: Enphase Energy, Inc., Petaluma, CA (US)

(72) Inventors: Nitish Mathur, Fremont, CA (US); Ashish Bansal, Karnataka (IN); Sumit Saraogi, Fremont, CA (US); Rohit Harlalka, Karnataka (IN); Karthik Lakshminarayanan, Karnataka (IN); Ashok Kumar Balasubramaniam, Karnataka (IN); Samuel Mattathil Joseph, Karnataka (IN)

(73) Assignee: Enphase Energy, Inc., Petaluma, CA (US)

( * ) Notice: Subject to any disclaimer, the term of this patent is extended or adjusted under 35 U.S.C. 154(b) by 246 days.

(21) Appl. No.: 17/091,139

(22) Filed: Nov. 6, 2020

(65) Prior Publication Data

US 2021/0133762 A1 May 6, 2021

Related U.S. Application Data

(60) Provisional application No. 62/931,765, filed on Nov. 6, 2019.

(51) Int. Cl.
*G06Q 30/00* (2023.01)
*G08B 21/18* (2006.01)
(Continued)

(52) U.S. Cl.
CPC .......... *G06Q 30/012* (2013.01); *G05B 15/02* (2013.01); *G06Q 10/0833* (2013.01);
(Continued)

(58) Field of Classification Search
CPC ............ G06Q 30/012; G06Q 10/0833; G06Q 10/10; G06Q 10/20; G06Q 50/06; G05B 15/02; G08B 21/185; H02J 3/381; H02J 13/00022; H02J 2300/20; H02J 13/00007; H02J 13/00006; Y02E 40/70; Y02E 60/00;
(Continued)

(56) References Cited

U.S. PATENT DOCUMENTS 8,229,861 B1  7/2012  Trandal et al.
8,295,452 B1  10/2012  Trandal et al.
(Continued)

FOREIGN PATENT DOCUMENTS

JP       2018/160124 A    10/2018

*Primary Examiner* — Charles R Kasenge
(74) *Attorney, Agent, or Firm* — Moser Taboada

(57) ABSTRACT

Methods and apparatus are provided herein. For example, a method for maintaining a power conversion system can include transmitting, to a computing apparatus in operable communication with the power conversion system, an alert message indicating non-working microinverters and which of the non-working microinverters are under warranty and eligible for replacement; receiving, from the computing apparatus, a request for replacement for the non-working microinverters; and transmitting, to the computing apparatus, an acknowledgment message indicating that the request has been successfully received and replacements for the non-working microinverters are being shipped.

15 Claims, 7 Drawing Sheets

(51) Int. Cl.
*G05B 15/02* (2006.01)
*G06Q 10/00* (2023.01)
*G06Q 10/10* (2023.01)
*G06Q 10/08* (2023.01)
*H02J 3/38* (2006.01)
*H02J 13/00* (2006.01)
*G06Q 30/012* (2023.01)
*G06Q 10/20* (2023.01)
*G06Q 10/0833* (2023.01)
*G06Q 50/06* (2012.01)

(52) U.S. Cl.
CPC ............. *G06Q 10/10* (2013.01); *G06Q 10/20* (2013.01); *G08B 21/185* (2013.01); *H02J 3/381* (2013.01); *H02J 13/00022* (2020.01); *G06Q 50/06* (2013.01); *H02J 2300/20* (2020.01)

(58) Field of Classification Search
CPC ...... Y04S 10/123; Y04S 10/50; Y04S 40/121; Y04S 40/126
See application file for complete search history.

(56) References Cited

U.S. PATENT DOCUMENTS

| | | | |
|---|---|---|---|
| 10,599,747 B1* | 3/2020 | Hoff | G06Q 50/06 |
| 2003/0061104 A1 | 3/2003 | Thomson et al. | |
| 2005/0144183 A1 | 6/2005 | McQuown et al. | |
| 2012/0227792 A1* | 9/2012 | Chen | H01L 31/02 136/251 |
| 2012/0239581 A1 | 9/2012 | Mosher | |
| 2018/0240124 A1* | 8/2018 | Natarajan | G06Q 30/014 |

\* cited by examiner

METHODS AND APPARATUS FOR MAINTAINING A POWER CONVERSION SYSTEM

CROSS-REFERENCE TO RELATED APPLICATIONS

This application claims the benefit of and priority to U.S. Provisional Patent Application Ser. No. 62/931,765, which was filed on Nov. 6, 2019, the entire contents of which is incorporated herein by reference.

BACKGROUND

Field of the Disclosure

Embodiments of the present disclosure relate generally to monitoring for power generation systems and, more particularly, methods and apparatus for requesting replacements of faulty system components under warranty.

Description of the Related Art

The current worldwide growth of energy demand coupled with the desire to move away from fossil fuels is leading to increased interest in and deployment of renewable energy systems, such as solar power systems. This increased demand for solar power systems has increased the burden on solar companies for providing customer support for a rapidly growing customer base.

Therefore, there is a need for providing superior customer experience without scaling up customer support organizations.

SUMMARY

Methods and apparatus for maintaining a power conversion system. For example, a method for maintaining a power conversion system can include transmitting, to a computing apparatus in operable communication with the power conversion system, an alert message indicating non-working microinverters and which of the non-working microinverters are under warranty and eligible for replacement; receiving, from the computing apparatus, a request for replacements for the non-working microinverters; and transmitting, to the computing apparatus, an acknowledgment message indicating that the request has been successfully received and the replacements for the non-working microinverters are being shipped.

In accordance with at least some embodiments, a non-transitory computer readable storage medium having stored thereon instructions that when executed cause a processor to perform a method for maintaining a power conversion system. The method can include transmitting, to a computing apparatus in operable communication with the power conversion system, an alert message indicating non-working microinverters and which of the non-working microinverters are under warranty and eligible for replacement; receiving, from the computing apparatus, a request for replacements for the non-working microinverters; and transmitting, to the computing apparatus, an acknowledgment message indicating that the request has been successfully received and the replacements for the non-working microinverters are being shipped.

In accordance with at least some embodiments, a power conversion system can include a distributed energy resource comprising at least one renewable energy source coupled to at least one microinverter; and a controller configured to: transmit, to a computing apparatus in operable communication with the power conversion system, an alert message indicating non-working microinverters and which of the non-working microinverters are under warranty and eligible for replacement; receive, from the computing apparatus, a request for replacements for the non-working microinverters; and transmit, to the computing apparatus, an acknowledgment message indicating that the request has been successfully received and replacements for the non-working microinverters are being shipped.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure generally relate to methods and apparatus for easy replacement of distributed energy resource components under warranty for installers. For example, in at least some embodiments, methods and apparatus are configured to allow microinverter users to easily and intuitively claim replacement under warranty for a faulty microinverter via one or more computing apparatus, such as a mobile device (e.g., a smartphone, tablet, and the like). For example, in at least some embodiments, a user can receive an automatic notification of one or more malfunctioning microinverters that are eligible for replacement under warranty. Subsequently, a user can click, tap, etc. on a symbol displayed on the computing apparatus, thus allowing a user to easily submit a replacement request for the one or more malfunctioning, non-working, or non-reporting microinverters.

Figure 1:
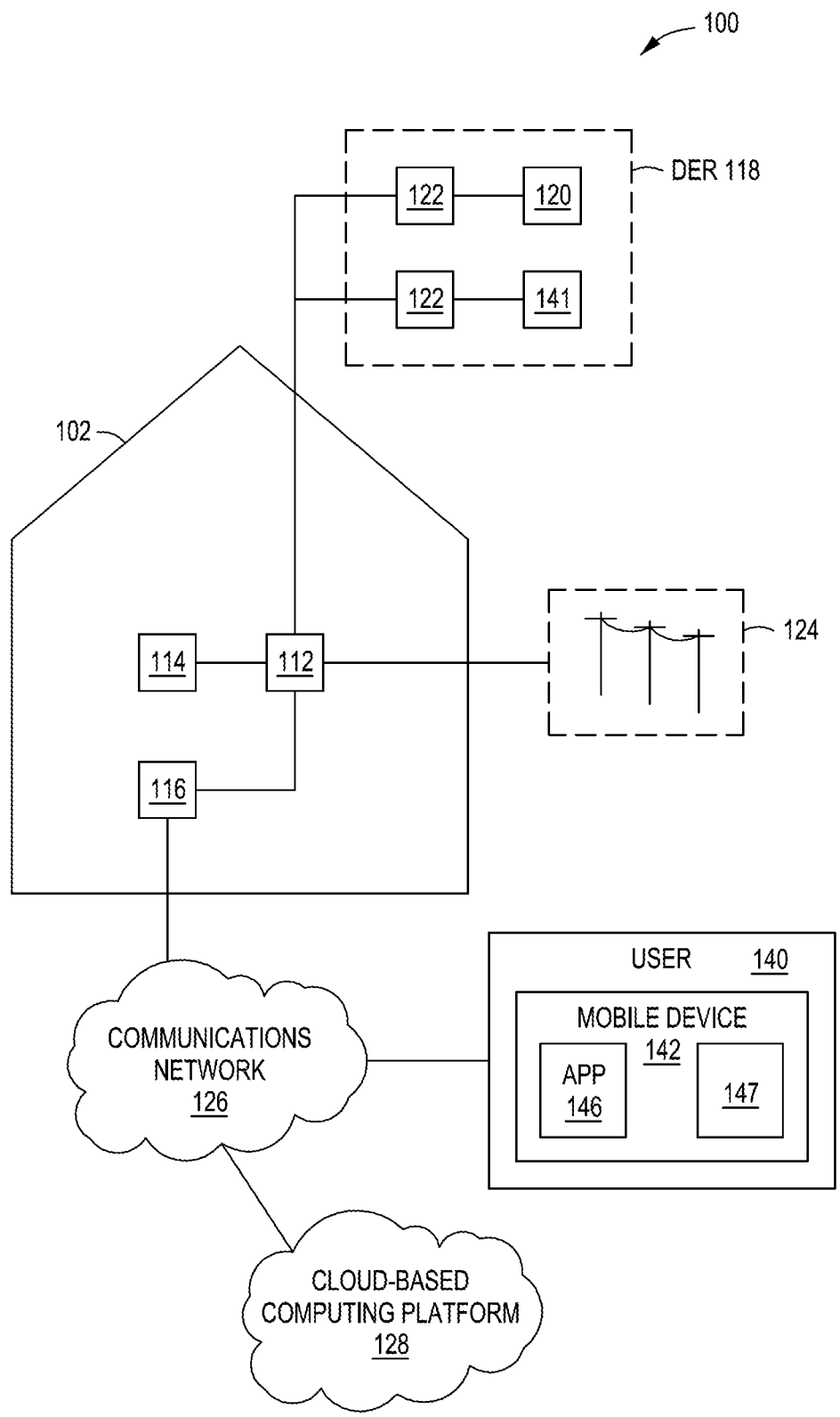
FIG. 1 is a block diagram of a power conversion system in accordance with one or more embodiments of the present disclosure.

FIG. 1 is a block diagram of a power conversion system 100 in accordance with one or more embodiments of the present disclosure. The power conversion system 100 of FIG. 1 is one variation of a myriad of possible system configurations. Additionally, the methods and apparatus disclosed herein are configured to function in a variety of environments and systems.

The power conversion system 100 comprises a structure 102, such as a residential or commercial building, coupled to a DER 118 (distributed energy resource) and a power grid 124 (e.g., a commercial power grid). The DER 118 is situated external to the structure 102. For example, the DER 118 may be located on a roof of the structure 102. The structure 102 comprises a load center 112 coupled to the DER 118 and to the power grid 124, as well as to one or more loads and/or energy storage devices 114 (e.g., appliances, electric hot water heaters, and the like), and a DER controller 116.

The DER 118 comprises at least one RES (renewable energy source) coupled to power conditioners 122 (e.g., microinverters). For example, the DER 118 may comprise a plurality of RESs 120 coupled to a plurality of power conditioners 122 in a one-to-one correspondence. In at least some embodiments, each RES 120 is a photovoltaic (PV) module, although in other embodiments the RESs 120 may be any type of system for generating DC power from a renewable form of energy, such as wind, hydro, and the like. The DER 118 may further comprise at least one battery 141 (or other types of energy storage/delivery devices) coupled to power conditioners 122 in a one-to-one correspondence. The power conditioners 122 convert the generated DC power from the RESs 120 and/or the at least one battery 141 to AC power that is grid-compliant and couple the generated AC power to the power grid 124 via the load center 112. The generated AC power may be additionally or alternatively coupled via the load center 112 to the one or more loads and/or energy storage devices 114.

The power conditioners 122 may communicate with one another using power line communication (PLC), although additionally and/or alternatively other types of wires and/or wireless communication may be used.

In some embodiments the power conditioners 122 are bidirectional converters that can convert DC power from the RESs 120 and/or the at least one battery 141 to AC power and can convert AC power (e.g., from the power grid 124) to DC power that may be stored, for example in the at least one battery 141 and/or delivered to one or more of the loads and/or energy storage devices 114. In some alternative embodiments, the power conditioners 122 may be AC-AC converters that convert one type of AC power to another type of AC power. In other alternative embodiments, the power conditioners 122 may be DC-DC converters that convert one type of DC power to another type of DC power. In some of such embodiments, the DC-DC converters may be coupled to a main DC-AC inverter for converting the generated DC output to an AC output.

In one or more embodiments the DER 118 may operate as a microgrid when the power grid 124 is unavailable. In one or more alternative embodiments the power conversion system 100 is not connected to the power grid 124 or any other power grid and the DER 118 operates as an off-grid microgrid.

The DER controller 116 is coupled to the load center 112 and communicates with the power conditioners 122 using power line communications (PLC), although additionally or alternatively other types of wired and/or wireless techniques may be used. The DER controller 116 may provide operative control of the DER 118 and/or receive data or information from the DER 118. For example, the DER controller 116 (e.g., processor) may be a gateway that receives data (e.g., alarms, messages, operating data, performance data, and the like) from the power conditioners 122 and communicates the data and/or other information via the communications network 126 to a cloud-based computing platform 128, to a remote device or system, such as a master controller (not shown), and the like. The DER controller 116 may utilize wired and/or wireless techniques for coupling to the communications network 126. In some embodiments, the DER controller 116 may be wirelessly coupled to the communications network 126 via a commercially available router or other suitable wireless communication apparatus. The DER controller 116 may also send control signals to the power conditioners 122, such as control signals generated by the DER controller 116 or received from a remote device or the cloud-based computing platform 128.

In one or more embodiments, the user 140 may be able to access (e.g., via a conventional web browser) web-based DER monitoring and analysis software (e.g., application 146) such as a DER monitoring and analysis website, for obtaining performance and analysis information pertaining to the DER 118. For example, the user 140 may be able to view status of the DER 118 (such as energy production data, indication of a malfunction of a power conditioner, and the like), history reports (such as historical production data), performance charts, and the like. In some embodiments, the DER monitoring application may reside on a cloud-based computing platform 128. In some alternative embodiments, the DER monitoring application may reside on a remote server or controller (not shown).

Additionally, a user 140 can have a mobile device 142 (such as a smart phone, tablet, or the like) with the application 146 installed on the mobile device 142 (e.g., on a 147 memory including volatile memory and/or non-volatile memory) for obtaining, for example from the cloud-based computing platform 128, performance and analysis information pertaining to the DER 118 (e.g., DER performance data and reports, DER status information, and the like). The application 146 may present the various information to the user on one or more display screens, and allows the user to select various information for display. The application 146 may run on commercially available operating systems, such as IOS®, ANDROID®, and the like.

The memory 147 (e.g., non-transitory computer readable storage medium) on the mobile device 142 is configured to store data or commands/instructions related to at least one of the other components of the mobile device 142. The memory 147 is configured to store the application 146 and may include a kernel, middleware, and/or an API (not shown). The kernel, the middleware, or at least part of the API may be called an operating system.

In accordance with the present disclosure, the application 146 includes a one-click warranty feature for easy replacement of one or more components of the DER 118, such as power conditioners, batteries, RESs, etc. For illustrative purposes, the one-click warranty feature is described herein for easy replacement the power conditioners 122 under warranty for installers. For example, the one-click warranty feature of the application 146 enables the user 140 to easily claim replacement under warranty for faulty power conditioners 122.

Figure 2:
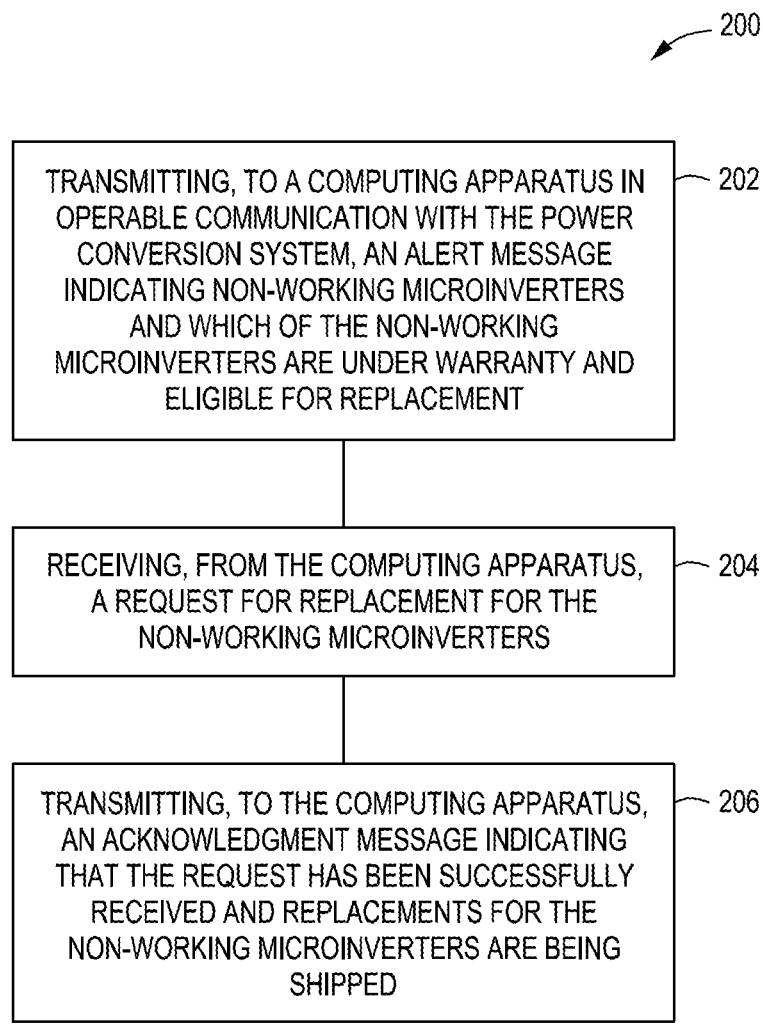
FIG. 2 is a flowchart of a method using a one-click warranty feature in accordance with one or more embodiments of the present disclosure.
Figure 3:
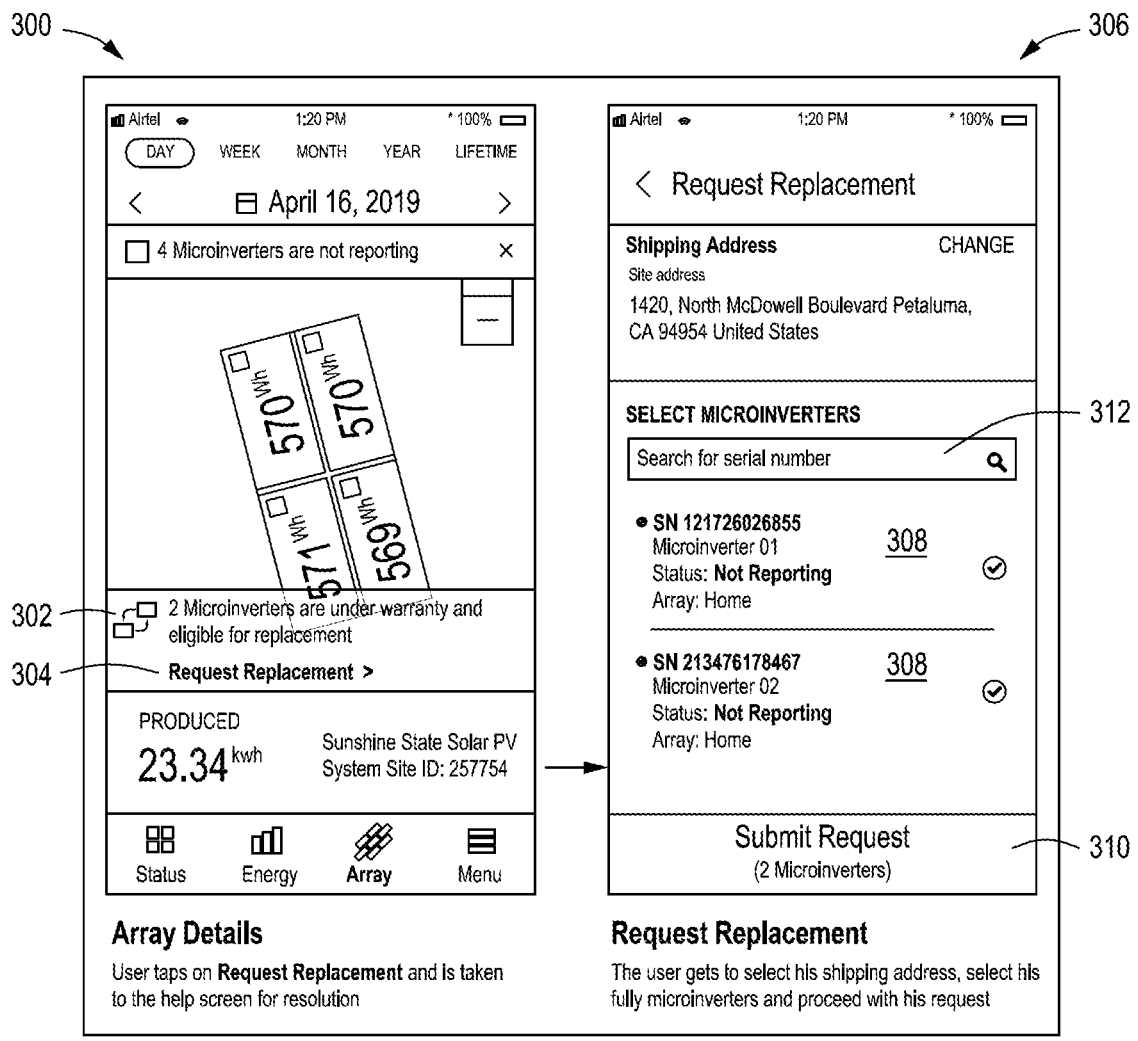
FIG. 3 depicts the one-click warranty feature return flow in accordance with one or more embodiments of the present disclosure.

FIG. 2 is a flowchart of a method using a one-click warranty feature of the application 146 in accordance with one or more embodiments of the present disclosure. At 202, the method includes transmitting, to a computing apparatus in operable communication with the power conversion system, an alert message indicating non-working microinverters and which of the non-working microinverters are under warranty and eligible for replacement. For example, on a display screen 300 (e.g., an array screen that provides an overview of energy and power production, and status of the system components), the user 140 receives a message 302 indicating a particular number of power conditioners 122 (e.g., microinverters) that are eligible for replacement under warranty (FIG. 3). For example, in at least some embodiments, the user 140 may receive a message transmitted from the DER controller 116 (via the communication network 126 and/or the cloud-based computing platform 128), stating that some microinverters (#) are eligible for replacement under warranty, where # is the number of eligible microinverters. The number of power conditioners 122 (e.g., an eligible power conditioner) is decided automatically based on the conditions of the power conditioners 122 and using an auto-approval algorithm for return merchandise authorization (RMA).

The received message additionally includes an icon for the user to click, tap, etc. to request replacement for the eligible power conditioners. For example, in at least some embodiments, an icon 304 is a text link that reads "Request Replacement." Upon clicking the icon 304, the user 140 is taken to a display screen 306 for replacing the eligible power conditioners, which may be referred to as a replacement screen.

On the display screen 306 a selectable area 308 configured to allow a user 140 to select the power conditioners 122 (e.g., an eligible power conditioner) that the user 140 wishes to replace is displayed. The selectable are 308 includes serial number information of a microinverter under warranty, a status of the non-working microinverter (e.g., not reporting), an array type (e.g., home, commercial, etc.). An optional search area 312 can be provided and configured to receive a user input for searching for one or more power conditioners by a serial number. The user 140 may, in certain embodiments, change, add and/or confirm certain information, such as a shipping address. Next, a user 140 can click an icon to submit the request, such as a "Submit Request" button 310.

Figure 4:
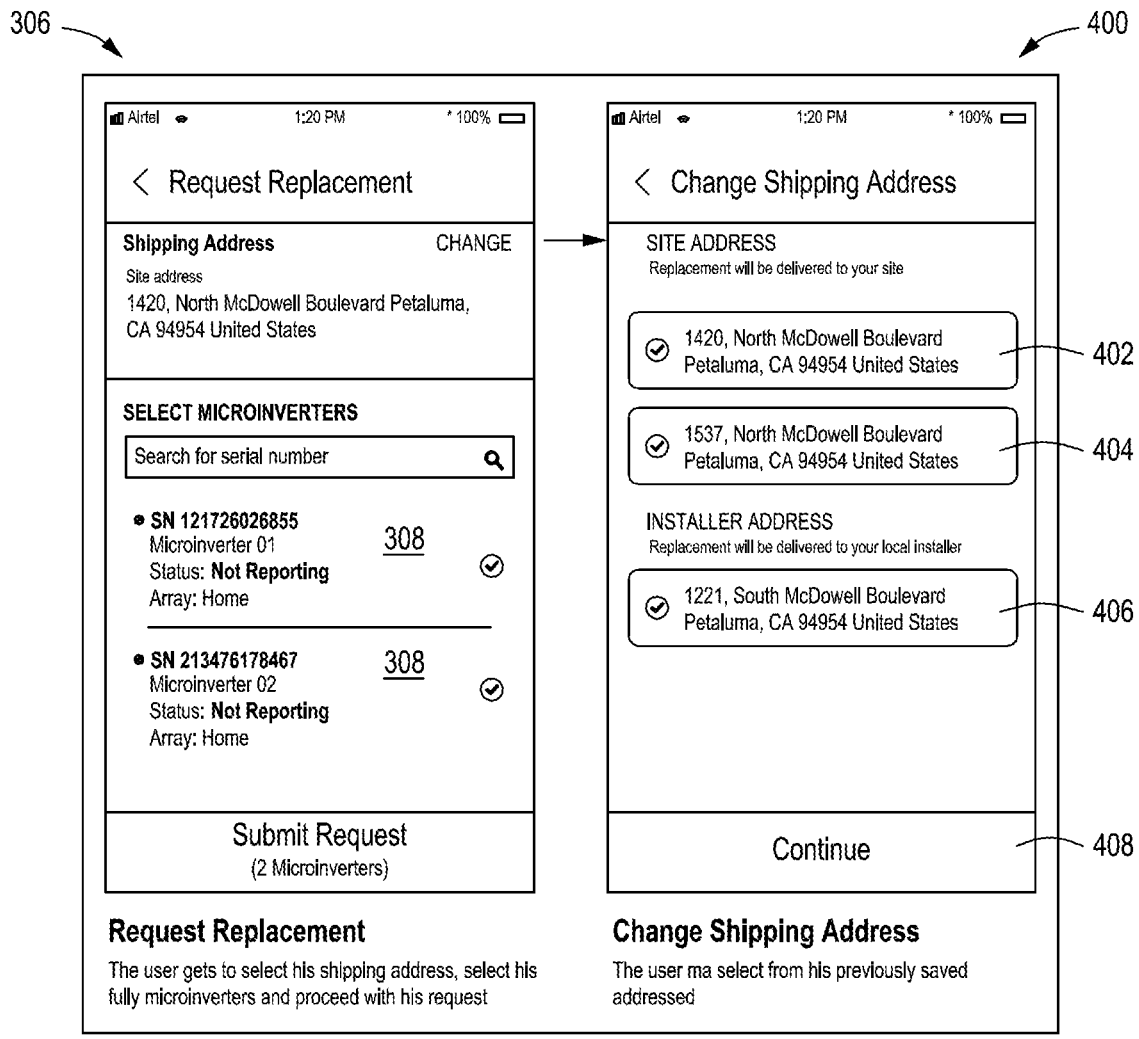
FIG. 4 depicts the one-click warranty feature address selection in accordance with one or more embodiments of the present disclosure.

Next, at 204, the method includes receiving, from the computing apparatus, a request for replacement for the non-working microinverters. As noted above, the request for replacement can include at least one of serial numbers of the non-working microinverters, a status of the non-working microinverters, or a shipping addresses to which the replacements for the non-working microinverters are to be shipped. For example, in at least some embodiments, after the user clicks the "Submit Request" button 310, the one-click warranty feature of the application 146 is configured to display a "Change Shipping Address" display screen 400 (FIG. 4) that is configured to provide a user with an option to change a shipping address. For example, in at least some embodiments, a previously selected/provided shipping address area 402 can be displayed and an alternative shipping address area 404 can also be displayed that is configured to allow a user to change/select a shipping address. In at least some embodiments, an installer address area 406 can be displayed and configured to allow a user to select the installer's address to which the eligible power conditioners will be delivered. Once the shipping address is confirmed, a user can select a "Continue" button 408.

Figure 5:
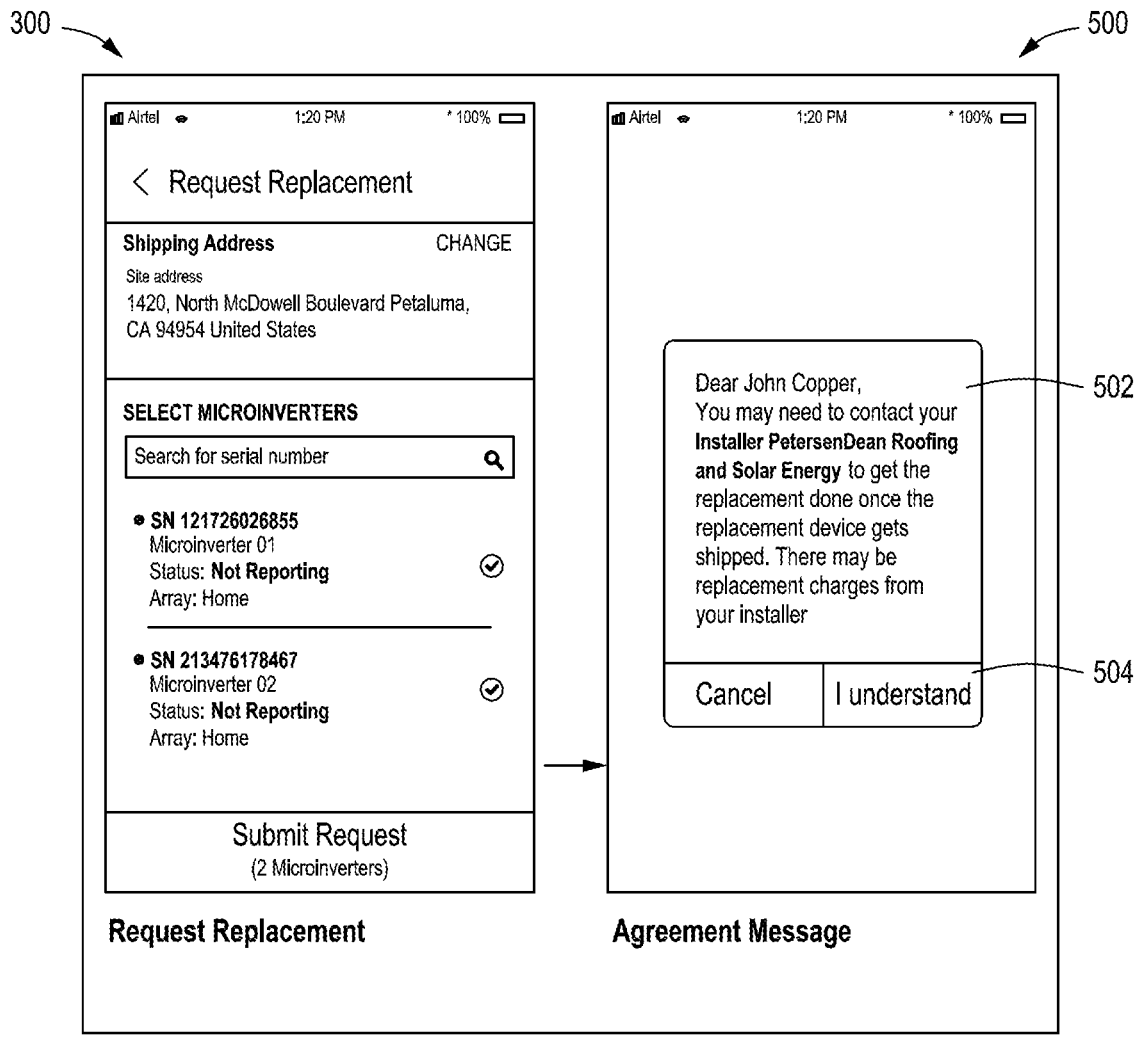
FIG. 5 depicts a first portion of the one-click warranty feature return flow in accordance with one or more embodiments of the present disclosure.

After the "Continue" button 408 is pressed, an agreement message screen 500 (e.g., a mandatory disclaimer including a call-to-action (CTA) indication, such as an "I Understand" CTA) can be displayed (FIG. 5). The agreement message screen 500 can provide one or more information boxes. For example, in at least some embodiments, an information box 502 can be configured provide a user with agreement information relating to an installer, possible charges, etc.

The agreement message provides a user with an option for accepting or declining terms in the agreement message. For example, in at least some embodiments, the information box 502 can also include an area 504 that allows a user to accept (e.g., "I understand") or decline (e.g., "Cancel") the agreement information.

Figure 6:
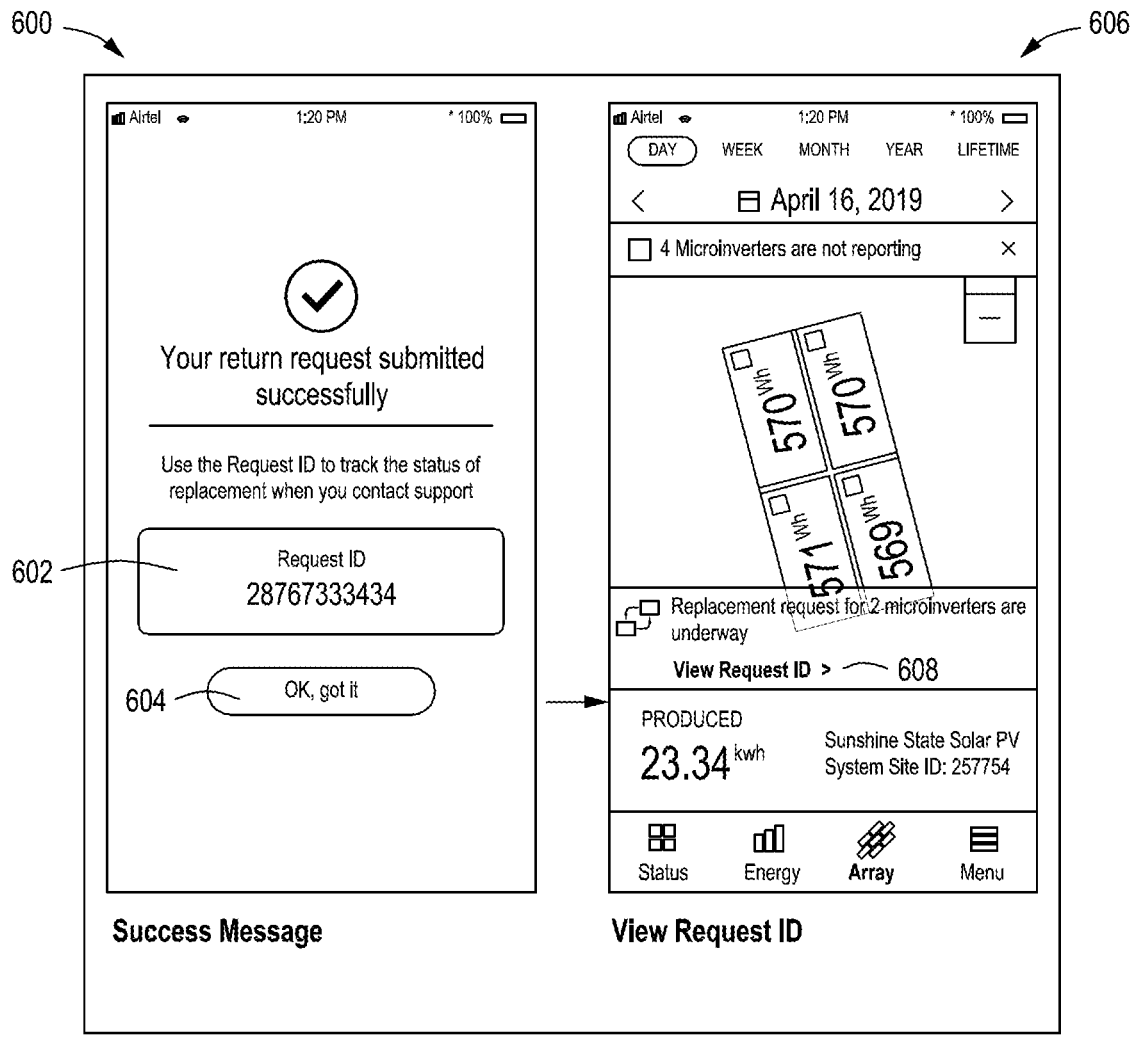
FIG. 6 depicts a second portion of the one-click warranty feature return flow in accordance with one or more embodiments of the present disclosure.
Figure 7:
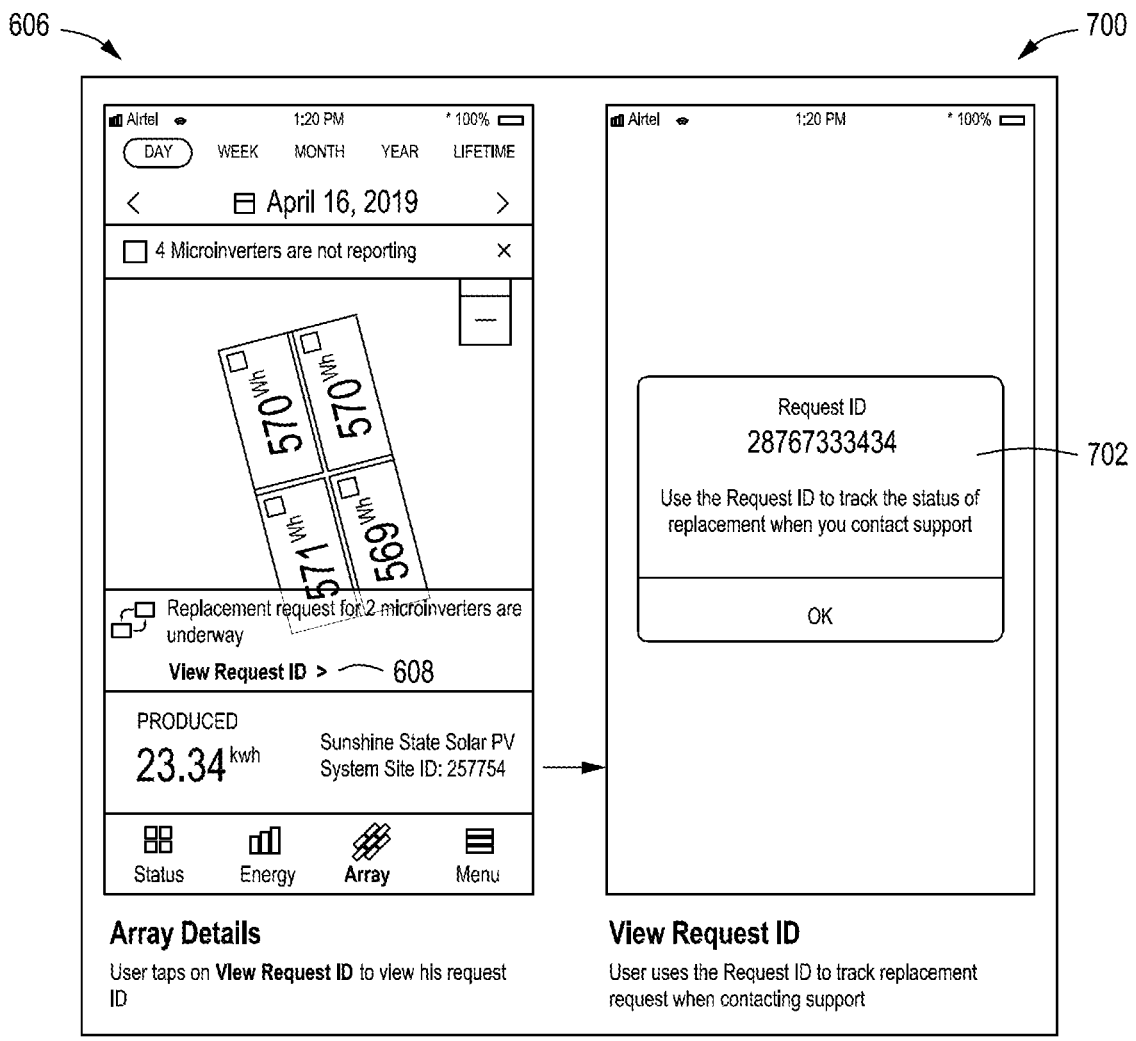
FIG. 7 depicts a third portion of the one-click warranty feature return flow in accordance with one or more embodiments of the present disclosure.

Next, at 206, the method includes transmitting, to the computing apparatus, an acknowledgment (success display) message indicating that the request has been successfully received and replacements for the non-working microinverters are being shipped. For example, upon clicking the "I Understand" CTA indication, the user 140 can be presented with an acknowledgement message display screen 600 (FIG. 6). The acknowledgement message display screen 600 can include an icon 602 (e.g., a request identification (ID) number), which can be configured to allow a user to track a status of the replacements for the non-working microinverters, follow ups, and the like). An acknowledgement area 604 (e.g., "OK, got it") can be displayed and configured to allow a user to complete the warranty process.

Thereafter, a display screen 606 can be displayed. In at least some embodiments, the display screen 606 is substantially identical to the display screen 300, with the exception of the icon 304 being replaced by an icon 608 (e.g., "View Request ID" link), which when pressed displays a display screen 700 that is configured to display a "Request ID" area 702, which allows a user to track a status of a replacement microinverter.

While the foregoing is directed to embodiments of the present disclosure, other and further embodiments of the disclosure may be devised without departing from the basic scope thereof.

The invention claimed is:

1. A method for maintaining a power conversion system, comprising:
   transmitting, to a computing apparatus in operable communication with the power conversion system, an alert message indicating non-working microinverters and how many of the non-working microinverters are under warranty and eligible for replacement;
   receiving, from the computing apparatus, a request for replacements for the non-working microinverters; and
   transmitting, to the computing apparatus, an acknowledgment message indicating that the request has been successfully received and the replacements for the non-working microinverters are being shipped.

2. The method of claim 1, wherein receiving the request for the replacements for the non-working microinverters comprises receiving at least one of serial numbers of the non-working microinverters, a status of the non-working microinverters, or a shipping addresses to which the replacements for the non-working microinverters are to be shipped.

3. The method of claim 1, wherein the request for the replacements for the non-working microinverters comprises a selectable area configured to allow a user to select the replacements for the non-working microinverters.

4. The method of claim 1, further comprising transmitting, to the computing apparatus, an agreement message providing a user with an option for accepting or declining terms in the agreement message.

5. The method of claim 1, wherein the acknowledgement message comprises a request identification (ID) number configured to allow a user to track a status of the replacements for the non-working microinverters.

6. A non-transitory computer readable storage medium having stored thereon instructions that when executed cause a processor to perform a method for maintaining a power conversion system, comprising:

transmitting, to a computing apparatus in operable communication with the power conversion system, an alert message indicating non-working microinverters and how many of the non-working microinverters are under warranty and eligible for replacement;

receiving, from the computing apparatus, a request for replacements for the non-working microinverters; and transmitting, to the computing apparatus, an acknowledgment message indicating that the request has been successfully received and the replacements for the non-working microinverters are being shipped.

7. The non-transitory computer readable storage medium of claim 6, wherein receiving the request for the replacements for the non-working microinverters comprises receiving at least one of serial numbers of the non-working microinverters, a status of the non-working microinverters, or a shipping addresses to which the replacements for the non-working microinverters are to be shipped.

8. The non-transitory computer readable storage medium of claim 6, wherein the request for the replacements for the non-working microinverters comprises a selectable area configured to allow a user to select the replacements for the non-working microinverters.

9. The non-transitory computer readable storage medium of claim 6, further comprising transmitting, to the computing apparatus, an agreement message providing a user with an option for accepting or declining terms in the agreement message.

10. The non-transitory computer readable storage medium of claim 6, wherein the acknowledgement message comprises a request identification (ID) number configured to allow a user to track a status of the replacements for the non-working microinverters.

11. A power conversion system, comprising:
a distributed energy resource comprising at least one renewable energy source coupled to at least one microinverter; and
a controller configured to:
transmit, to a computing apparatus in operable communication with the power conversion system, an alert message indicating non-working microinverters and how many of the non-working microinverters are under warranty and eligible for replacement;
receive, from the computing apparatus, a request for replacements for the non-working microinverters; and
transmit, to the computing apparatus, an acknowledgment message indicating that the request has been successfully received and replacements for the non-working microinverters are being shipped.

12. The power conversion system of claim 11, wherein receiving the request for the replacements of the non-working microinverters comprises the controller being further configured to receive at least one of serial numbers of the non-working microinverters, a status of the non-working microinverters, or a shipping addresses to which the replacements for the non-working microinverters are to be shipped.

13. The power conversion system of claim 11, wherein the request for the replacements for the non-working microinverters comprises a selectable area configured to allow a user to select the replacements for the non-working microinverters.

14. The power conversion system of claim 11, where the controller is further configured to transmit, to the computing apparatus, an agreement message providing a user with an option for accepting or declining terms in the agreement message.

15. The power conversion system of claim 11, wherein the acknowledgement message comprises a request identification (ID) number configured to allow a user to track a status of the replacements for the non-working microinverters.

* * * * *